(12) United States Patent
Eloul et al.

(10) Patent No.: US 12,386,979 B2
(45) Date of Patent: Aug. 12, 2025

(54) SYSTEMS AND METHODS FOR FEDERATED MODEL VALIDATION AND DATA VERIFICATION

(71) Applicant: JPMORGAN CHASE BANK, N.A., New York, NY (US)

(72) Inventors: Shaltiel Eloul, London (GB); Sean Moran, London (GB); Fanny Silavong, London (GB); Sanket Kamthe, London (GB); Antonios Georgiadis, London (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 287 days.

(21) Appl. No.: 18/156,607

(22) Filed: Jan. 19, 2023

(65) Prior Publication Data

US 2023/0229786 A1    Jul. 20, 2023

(30) Foreign Application Priority Data

Jan. 20, 2022    (GR) .............................. 20220100050

(51) Int. Cl.
  *G06F 21/00*    (2013.01)
  *G06F 21/57*    (2013.01)
  (Continued)

(52) U.S. Cl.
  CPC ........... *G06F 21/577* (2013.01); *G06N 20/00* (2019.01); *G06F 2221/033* (2013.01)

(58) Field of Classification Search
  CPC . G06F 21/577; G06F 2221/033; G06N 20/00; G06N 3/0464; G06N 3/098
  See application file for complete search history.

(56) References Cited

U.S. PATENT DOCUMENTS

2007/0240621 A1* 10/2007 Qiao ..................... F41H 5/04
                                                89/36.01
2021/0357508 A1* 11/2021 Elovici ............... G06F 11/3684
(Continued)

FOREIGN PATENT DOCUMENTS

CN         112765559         5/2021
CN         112765559  A  *   5/2021

OTHER PUBLICATIONS

International Search Report and Written Opinion of the International Searching Authority, dated May 3, 2023, from corresponding International Application No. PCT/US2023/061028.
(Continued)

*Primary Examiner* — Lisa C Lewis
(74) *Attorney, Agent, or Firm* — GREENBERG TRAURIG LLP (57) ABSTRACT

Systems and methods for federated model validation and data verification are disclosed. A method may include: (1) receiving, by a local computer program executed by client system, a federated machine learning model from a federated model server; (2) testing, by the local computer program and using a policy service, the federated machine learning model for vulnerabilities to attacks; (3) accepting, by the local computer program, the federated machine learning model in response to the federated machine learning model passing the testing; (4) training, by the local computer program, the federated machine learning model using input data comprising local data and outputting training parameters; (5) identifying, by the local computer program using the policy service, accidental leakage and/or contamination by comparing the training parameters to the input data; and (6) providing, by the local computer program, the training parameters to the federated model server.

10 Claims, 3 Drawing Sheets

(51) Int. Cl.
*G06N 20/00* (2019.01)
*H04L 29/06* (2006.01)

(56) References Cited

U.S. PATENT DOCUMENTS

2021/0360010 A1* 11/2021 Zaccak .................. G06N 20/20
2022/0125530 A1* 4/2022 Toporek ................ A61B 90/37
2023/0022401 A1* 1/2023 Amiri .................... G06N 20/00

OTHER PUBLICATIONS

Kariyappa, Sanjay; "Gradient Inversion Attack: Leaking Private Labels in Two-Party Split Learning", Cornell University Library, 201 Olin Library Cornell University Ithaca, NY 14853, Nov. 25, 2021.

* cited by examiner

SYSTEMS AND METHODS FOR FEDERATED MODEL VALIDATION AND DATA VERIFICATION

RELATED APPLICATIONS

This application claims priority to, and the benefit of, Greek Patent Application No. 20220100050, filed Jan. 20, 2022, the disclosure of which is hereby incorporated, by reference, in its entirety.

BACKGROUND OF THE INVENTION

1. Field of the Invention

Embodiments generally relate to systems and methods for federated model validation and data verification.

2. Description of the Related Art

Federated learning enables training a model from multiple clients without sharing their data. This is typically done by client systems training local models using underlying data, and the sharing updates of the client systems' local model parameters. Sharing model parameters may, however, have the risk of exposing the underlying data itself, as the underlying data may be inverted back from the model parameters submitted to the universal model. For example, the model parameters updated by each client actually contain information on the data, and the model can be inverted back to the data itself, via a relatively simple numerical procedure. Basically, all clients that join the federation and shared model parameters risk exposing their complete data. Some federation configuration also includes learning from client to client, which means that data is not only leaked with the server but also possibly with an unknown random client.

This privacy vulnerability prevents federated learning from being fully trusted for any application that contains sensitive data or private data.

SUMMARY OF THE INVENTION

Systems and methods for federated model validation and data verification are disclosed.

In order to provide a policy for defending against attacks, embodiments may select an architecture that can successfully defend against inversion of gradients in federated learning framework. For example, choosing the loss function or mini batch may obtain highly mixed-gradients that provide numerical resistance to inversion of gradients. Embodiments may be used with dense layers models and convolutional networks for image classification. Embodiments may use Euclidean loss functions instead of cross-entropy loss to increase privacy, thereby allowing additional filters to be used in convolutional layers.

Embodiments may provide continuous metrics to determine if information was recovered based on image variation distance (AVD). This allows to determine the rate of successful attacks in a given model and will help to develop policy for federated learning in order to validate or tune models against inversion of client data.

According to one embodiment, a method for federated model validation and data verification may include: (1) receiving, by a client system, a federated machine learning model from a federated model server; (2) testing, by a policy service executed by the client system, the federated machine learning model for vulnerabilities to attacks; (3) accepting, by the client system, the federated machine learning model in response to the federated machine learning model passing the testing; (4) training, by the client system, the federated machine learning model using input data comprising local data; (5) identifying, by the policy service, accidental leakage and/or contamination by comparing an output of the training to the input data; and (6) providing, by the client system, local parameters from the training to the federated model server.

According to one embodiment, a method for federated model validation and data verification may include: (1) receiving, by a local computer program executed by client system, a federated machine learning model from a federated model server; (2) testing, by the local computer program and using a policy service, the federated machine learning model for vulnerabilities to attacks; (3) accepting, by the local computer program, the federated machine learning model in response to the federated machine learning model passing the testing; (4) training, by the local computer program, the federated machine learning model using input data comprising local data and outputting training parameters; (5) identifying, by the local computer program using the policy service, accidental leakage and/or contamination by comparing the training parameters to the input data; and (6) providing, by the local computer program, the training parameters to the federated model server.

In one embodiment, the federated machine learning model may be tested for vulnerabilities to attacks using brute force trials, using numerical simulation, etc.

In one embodiment, the comparing may use correlation tests to correlate the training parameters to the input data, may use an inversion of gradients or weights of the training parameters to the input data, etc.

In one embodiment, the method may also include rejecting, by the local computer program, the federated machine learning model in response to an identification of accidental leakage and/or contamination.

In one embodiment, the method may also include adding, by the local computer program, noise to the training parameters in response to an identification of accidental leakage and/or contamination.

In one embodiment, the method may also include executing, by the local computer program, a plurality of runs using the federated machine learning model before sending the training parameters to the federated model server.

According to another embodiment, a system may include a federated model server executing a federated model computer program and maintaining a federated machine learning model and a plurality of client electronic devices, each client executing a local computer program, a policy service computer program, and maintaining a local machine learning model, wherein one of the local computer program receives the federated machine learning model from the federated model computer program, test the federated machine learning model for vulnerabilities to attacks using the policy service computer program, accepts the federated machine learning model in response to the federated machine learning model passing the test, trains the federated machine learning model using input data comprising local data and outputting training parameters, identify accidental leakage and/or contamination by comparing the training parameters to the input data using the policy service computer program, and provide the training parameters to the federated model server.

In one embodiment, the federated machine learning model may be tested for vulnerabilities to attacks using brute force trials, using numerical simulation, etc.

In one embodiment, the comparing may use correlation tests to correlate the training parameters to the input data, may use an inversion of gradients or weights of the training parameters to the input data, etc.

In one embodiment, the local computer program may reject the federated machine learning model in response to an identification of accidental leakage and/or contamination.

In one embodiment, the local computer program may add noise to the training parameters in response to an identification of accidental leakage and/or contamination.

In one embodiment, the local computer program may execute a plurality of runs using the federated machine learning model before sending the training parameters to the federated model server.

According to another embodiment, a non-transitory computer readable storage medium may include instructions stored thereon, which when read and executed by one or more computer processors, cause the one or more computer processors to perform steps comprising: receiving a federated machine learning model from a federated model server; testing, using a policy service, the federated machine learning model for vulnerabilities to attacks; accepting the federated machine learning model in response to the federated machine learning model passing the testing; training the federated machine learning model using input data comprising local data and outputting training parameters; identifying, using the policy service, accidental leakage and/or contamination by comparing the training parameters to the input data; and providing the training parameters to the federated model server.

In one embodiment, the federated machine learning model may be tested for vulnerabilities to attacks using brute force trials, using numerical simulation, etc.

In one embodiment, the comparing may use correlation tests to correlate the training parameters to the input data, may use an inversion of gradients or weights of the training parameters to the input data, etc.

In one embodiment, the non-transitory computer readable storage medium may also include instructions stored thereon, which when read and executed by one or more computer processors, cause the one or more computer processors to add noise to the training parameters in response to an identification of accidental leakage and/or contamination, to reject the federated machine learning model in response to an identification of accidental leakage and/or contamination.

In one embodiment, the non-transitory computer readable storage medium may also include instructions stored thereon, which when read and executed by one or more computer processors, cause the one or more computer processors to add noise to the training parameters in response to an identification of accidental leakage and/or contamination, to execute a plurality of runs using the federated machine learning model before sending the training parameters to the federated model server, etc.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments generally relate to systems and methods federated model validation and data verification.

The disclosure of Eloul et al., "Enhancing Privacy against Inversion Attacks in Federated Learning by using Mixing Gradients Strategies" (2022) available at arxiv.org/abs/2204.12495, is hereby incorporated, by reference, in its entirety.

Embodiments may combine a policy service that may be launched with a federated learning service package and may be sent to client systems. In embodiments, the policy service may be an application in the machine learning pipeline between the data injection and the neural network model.

Once the model is registered in the client, the policy service may run a test prior confirming to join the federation. For example, the policy service may use the model and the data structure of the model to give a confidence level regarding whether the model will expose client data. This may be done, for example, by "brute force" trials of various attacks using, for example, numerical simulation for trying inverting model parameters. Embodiments may also use the architecture structure of the neural network to identify what can be changed in the model architecture to provide a higher confidence level that client data will not be exposed.

The model can also use 'differential privacy' defense by adding noise to model parameters or to their gradients until privacy criteria is obtained.

Later and during the federation, local model parameters may be checked against the output parameters of local models, for example using statistical correlation, time correlation by saving model changes over period of training rounds, and by using direct inversion, to prevent accidental leakage and/or contamination of the local data.

Embodiments may increase the privacy of a federated learning model, and may provide increased reliability to clients.

Embodiments may provide a policy service mechanism that validates machine learning models before the client joins the federation in distributed learning using up-to-date inversion numerical procedures, estimations, interpolations, etc. to test the vulnerability of the model. Embodiments may monitor communications during training to make sure that the data is not leaked in other ways. The policy service may increase the client's trust in joining federation. Embodiments also provide a platform for federation learning that allows exploring sensitive applications such as in financial products, medical information, etc.

Figure 1:
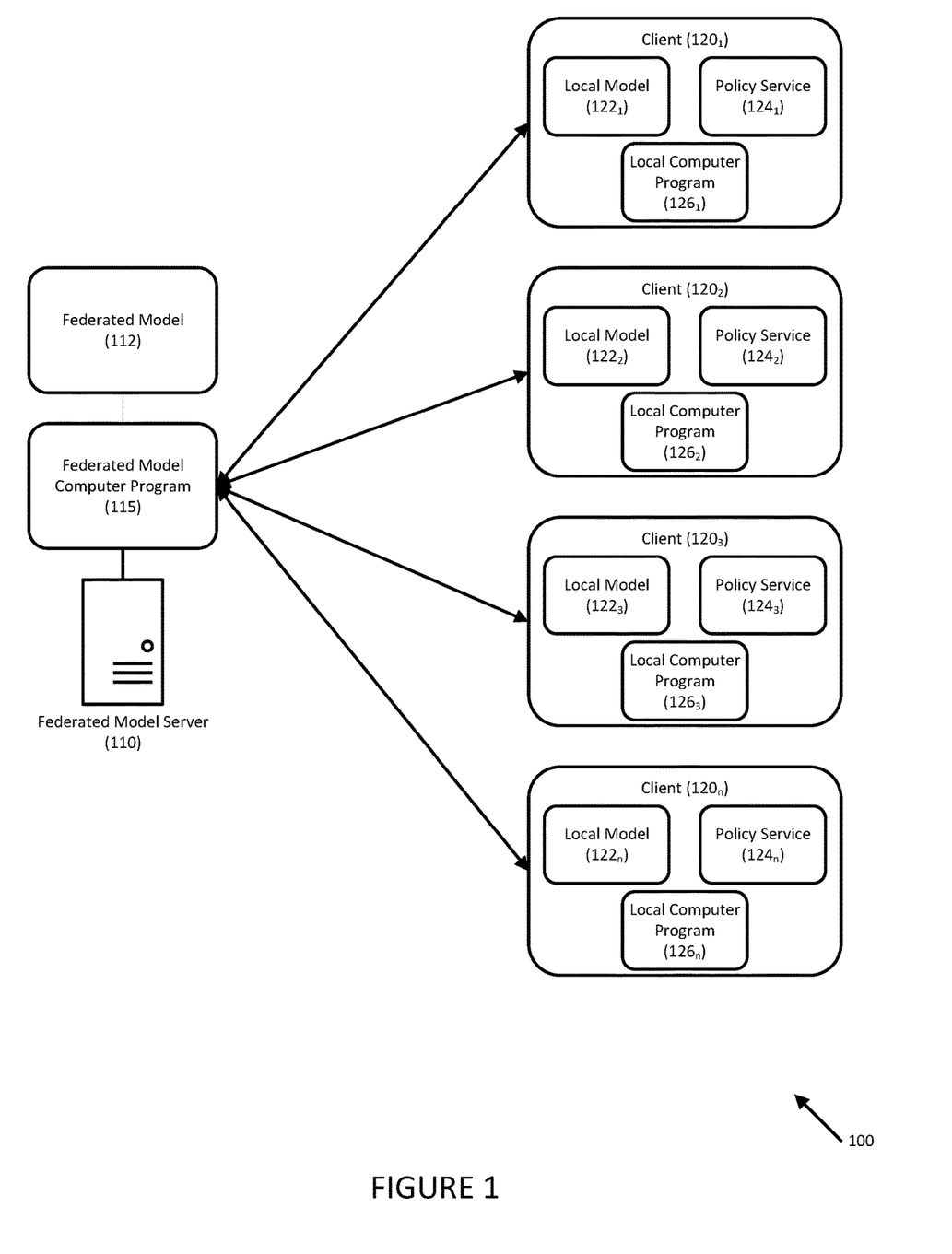
FIG. 1 illustrates a system for federated model validation and data verification according to an embodiment.

Referring to FIG. 1, a system for federated model validation and data verification is disclosed according to an embodiment. System 100 may include federated model server 110, which may execute federated model computer program 115. Federated model computer program 115 may generate federated machine learning model 112 (e.g., a neural network model) for clients 120 (e.g., $120_1$, $120_2$, $120_3$, . . . $120_n$). Federated model computer program 115 may provide parameters for federated machine learning model 112, or federated machine learning model 112 itself, to clients 120, and may receive local parameters from clients 120 after clients 120 have trained federated machine learning model 112 with the local data resulting in local models 122 (e.g., $120_1$, $120_2$, $120_3$, . . . $120_n$). Federated model computer program 115 may then update federated machine learning model 112 with the parameters, and may provide updated parameters for, or updated federated machine learning model 112, to the clients. The process may continue until no updates are necessary.

Each client 120 may executed local computer program 126 (e.g., $126_1$, $126_2$, $126_3$, ... $126_n$) that may interface with federated model computer program 115 and may train local models 122 with federated model 112. Local computer programs 126 may execute policy service 124 and may take actions (e.g., rejecting the federated model, adding noise, running multiple iterations, etc.) in response to an identification of accidental leakage and/or contamination.

Policy service 124 (e.g., $124_1$, $124_2$, $124_3$, ... $124_n$) may be provided with each client 120, respectively, and may be part of the client federated learning flow. For example, once client 120 receives federated machine learning model 112 or parameters for federated machine learning model 112 from federated model computer program 115, policy service 124 may test federated machine learning model 112 for vulnerabilities to certain attacks. Policy service 124 may do this by "brute force" trials of various attacks using numerical simulation for trying inverting model parameters. Policy service 124 may also use the architectural structure of federated machine learning model 112 to identify any potential vulnerabilities in the model, and may provide recommendations on what can be changed to provide a higher confidence level.

Policy service 124 may also compare the output data from the training of local models 122 to the input data, for example using statistical correlation, direct inversion, etc. to prevent accidental leakage and/or contamination of the input in the model parameters. Policy service 124 may further inject noise or other data to the output parameters to further obscure the original local data.

Figure 2:
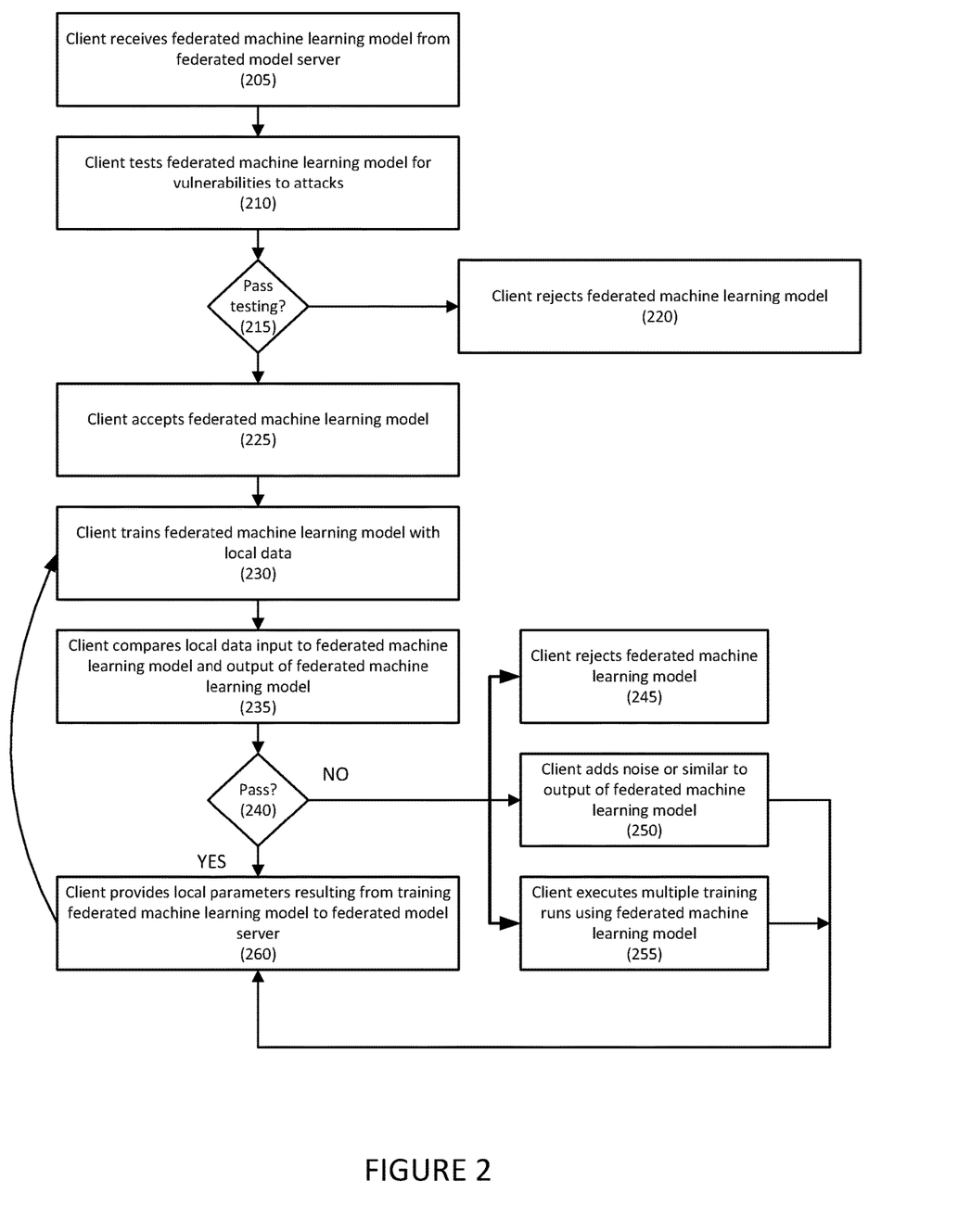
FIG. 2 illustrates a method for federated model validation and data verification according to an embodiment.

Referring to FIG. 2, a method for federated model validation and data verification is provided according to an embodiment.

In step 205, a local computer program executed by a client may receive a federated machine learning model, such as a neural network model, from, for example, a federated model server, over a computer network.

In step 210, the local computer program may test the federated machine learning model for vulnerabilities to attacks. For example, a policy service at each client may perform "brute force" trials of various attacks using, for example, numerical optimization by finding the data that obtains the same output of weights gradients, to try to invert parameters for the model or the model itself. Example of brute force trials are disclosed in Zhu et al., "Deep Leakage from Gradients" (2019) available at arxiv.org/abs/1906.08935, the disclosure of which is hereby incorporated, by reference, in its entirety.

Brute force trials may measure the recovery rate using metrics that compare input data to the inverted parameters. For example, metrics, such as Mean Squared Error (MSE), Structural Similarity Index Measure (SSIMS), Peak Signal-to-Noise Ratio (PSNR), AVD, etc., may rely on mutual information between the inverted and the input vectors.

In step 215, if the federated machine learning model does not pass testing, (e.g., if the recovery rate of the inversion of parameters is found above a certain threshold), in step 220, the local computer program may reject the federated machine learning model. In one embodiment, the client may identify changes to the federated machine learning model that would address the vulnerabilities. The local computer program may provide these recommendations to the federated model server, and the federated model server may implement the suggestions. Examples include reducing the machine learning model size, change the loss function, constraining labels of data to be similar, clipping gradients or parameter values, adding noise to parameters, etc.

In step 225, the local computer program may accept the federated machine learning model, and in step 230, the local computer program may train the federated machine learning model with local data, resulting in output data, such as local model parameters.

In step 235, the local computer program of a client may compare the local data input to the federated learning local model to the output of the weights or gradients calculated on the local model to prevent accidental leakage and/or contamination of the input in the model parameters. For example, a policy service may use statistical correlation, direct inversion, etc. to compare the input data to the output weights or their gradients. In one embodiment, the comparison may use a simple correlation threshold, and with inversion tests of the parameters, this can be used by recovery information of tested data with using any metric related to measure information recovery of the inversion results from the parameters.

In step 240, if the comparison does not pass (e.g., is outside of the threshold), the local computer program may take one of three options. In step 245, the local computer program may reject the federated machine learning model. For example, the local computer program may no longer participate in the federated training, and may not send local parameters to the federated model server.

Alternatively, in step 250, the local computer program may add noise or similar to the output of federated machine learning model to obscure the raw local data, or in step 260, the local computer program may execute multiple runs using the federated machine learning model which may obscure the data. After step 250 or 255, the process may continue to step 260.

If the comparison passes, or after an obscuring technique has been applied in steps 250 or 255, in step 260, the local computer program may provide the local parameters resulting from training federated machine learning model to the federated model server. The federated model server may update the federated machine learning model with the parameters from the clients that are in the federation, and may repeat the process until the model converges.

Figure 3:
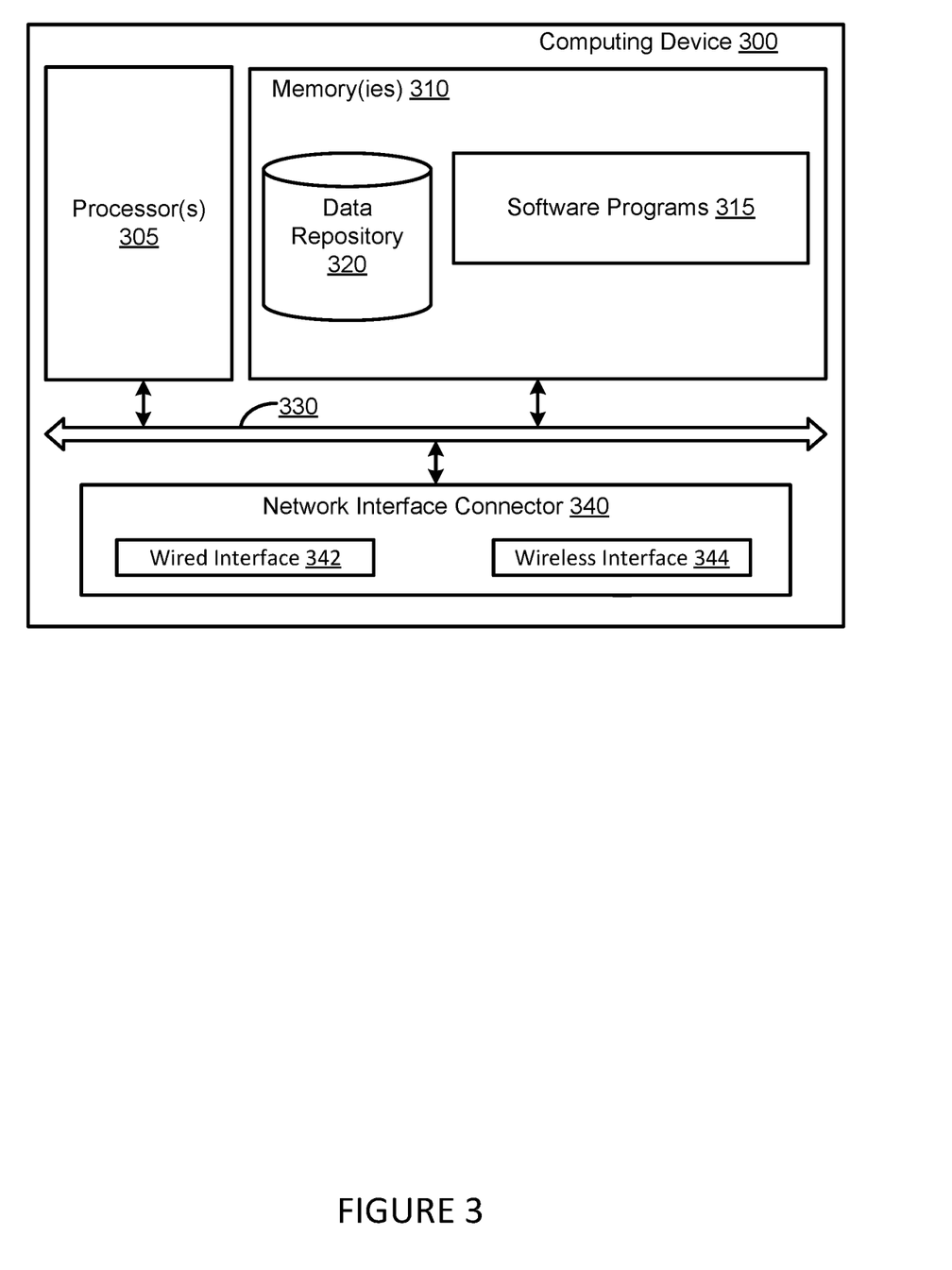
FIG. 3 depicts an exemplary computing system for implementing aspects of the present disclosure.

FIG. 3 depicts an exemplary computing system for implementing aspects of the present disclosure. FIG. 3 depicts exemplary computing device 300. Computing device 300 may represent the system components described herein. Computing device 300 may include processor 305 that may be coupled to memory 310. Memory 310 may include volatile memory. Processor 305 may execute computer-executable program code stored in memory 310, such as software programs 315. Software programs 315 may include one or more of the logical steps disclosed herein as a programmatic instruction, which may be executed by processor 305. Memory 310 may also include data repository 320, which may be nonvolatile memory for data persistence. Processor 305 and memory 310 may be coupled by bus 330. Bus 330 may also be coupled to one or more network interface connectors 340, such as wired network interface 342 or wireless network interface 344. Computing device 300 may also have user interface components, such as a screen for displaying graphical user interfaces and receiving input from the user, a mouse, a keyboard and/or other input/output components (not shown).

Although several embodiments have been disclosed, it should be recognized that these embodiments are not exclusive to each other, and features from one embodiment may be used with others.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for federated model validation and data verification, comprising:
   receiving, by a local computer program executed by client system, a federated machine learning model from a federated model server;
   testing, by the local computer program and using a policy service, the federated machine learning model for vulnerabilities to attacks;
   accepting, by the local computer program, the federated machine learning model in response to the federated machine learning model passing the testing;
   training, by the local computer program, the federated machine learning model using input data comprising local data and outputting training parameters;
   identifying, by the local computer program using the policy service, contamination by comparing the training parameters to the input data using an inversion of gradients of the training parameters to the input data; and
   providing, by the local computer program, the training parameters to the federated model server.

2. The method of claim 1, wherein the federated machine learning model is tested for vulnerabilities to attacks using brute force trials.

3. The method of claim 1, wherein the federated machine learning model is tested for vulnerabilities to attacks using numerical simulation.

4. The method of claim 1, wherein the comparing uses correlation tests to correlate the training parameters to the input data.

5. The method of claim 1, further comprising:
   rejecting, by the local computer program, the federated machine learning model in response to an identification of contamination.

6. The method of claim 1, further comprising:
   adding, by the local computer program, noise to the training parameters in response to an identification of contamination.

7. The method of claim 1, further comprising:
   executing, by the local computer program, a plurality of runs using the federated machine learning model before sending the training parameters to the federated model server.

8. A non-transitory computer readable storage medium, including instructions stored thereon, which when read and executed by one or more computer processors, cause the one or more computer processors to perform steps comprising:
   receiving a federated machine learning model from a federated model server;
   testing, using a policy service, the federated machine learning model for vulnerabilities to attacks;
   accepting the federated machine learning model in response to the federated machine learning model passing the testing;

training the federated machine learning model using input data comprising local data and outputting training parameters;

identifying, using the policy service, accidental leakage by comparing the training parameters to the input data using an inversion of gradients of the training parameters to the input data; and providing the training parameters to the federated model server.

9. The non-transitory computer readable storage medium of claim 8, wherein the federated machine learning model is tested for vulnerabilities to attacks using brute force trials or using numerical simulation.

10. The non-transitory computer readable storage medium of claim 8, further comprising instructions stored thereon, which when read and executed by one or more computer processors, cause the one or more computer processors to perform steps comprising adding noise to the training parameters in response to an identification of accidental leakage.

* * * * *